(12) United States Patent
VanHaelst

(10) Patent No.: US 10,384,781 B2
(45) Date of Patent: Aug. 20, 2019

(54) QUADCOPTER PRESSURE WASHER

(71) Applicant: Charles VanHaelst, Thomaston, GA (US)

(72) Inventor: Charles VanHaelst, Thomaston, GA (US)

(*) Notice: Subject to any disclaimer, the term of this patent is extended or adjusted under 35 U.S.C. 154(b) by 0 days.

(21) Appl. No.: 15/607,704

(22) Filed: May 30, 2017

(65) Prior Publication Data

US 2019/0084677 A1    Mar. 21, 2019

(51) Int. Cl.
| | |
|---|---|
| *B64D 1/00* | (2006.01) |
| *B64D 1/18* | (2006.01) |
| *B08B 3/02* | (2006.01) |
| *B64C 39/02* | (2006.01) |
| *G05D 1/00* | (2006.01) |
| *B64F 3/00* | (2006.01) |
| *A47L 1/02* | (2006.01) |
| *E04G 23/00* | (2006.01) |
| *E04D 15/00* | (2006.01) |

(52) U.S. Cl.
CPC .............. *B64D 1/18* (2013.01); *A47L 1/02* (2013.01); *B08B 3/024* (2013.01); *B64C 39/024* (2013.01); *B64F 3/00* (2013.01); *E04D 15/006* (2013.01); *E04G 23/002* (2013.01); *G05D 1/0016* (2013.01); *B08B 2203/0217* (2013.01); *B64C 2201/042* (2013.01); *B64C 2201/12* (2013.01); *B64C 2201/148* (2013.01)

(58) Field of Classification Search
CPC ............ B64C 39/024; B64C 2201/042; B05B 13/005; A62C 3/0228; A62C 3/242
USPC ............................................. 239/722; 169/53
See application file for complete search history.

(56) References Cited

U.S. PATENT DOCUMENTS

| | | | |
|---|---|---|---|
| 3,759,330 A * | 9/1973 | Rainey | B64D 1/16 169/13 |
| 9,489,937 B1 * | 11/2016 | Beard | G10K 11/178 |
| D789,248 S * | 6/2017 | Ketcher | D12/16.1 |
| 2012/0112007 A1* | 5/2012 | Hawass | A62C 3/0228 244/136 |
| 2013/0134254 A1* | 5/2013 | Moore | B64D 1/16 244/17.11 |
| 2014/0099853 A1* | 4/2014 | Condon | G05D 1/0033 446/37 |

(Continued)

*Primary Examiner* — Viet Le
(74) *Attorney, Agent, or Firm* — The Iwashko Law Firm, PLLC; Lev Ivan Gabriel Iwashko

(57) ABSTRACT

A quadcopter pressure washer that may facilitate cleaning objects and surfaces in remote areas. The quadcopter pressure washer includes a tubular airframe, a plurality of rotary motors, a battery and controller, a pair of antennae, a signal receiver, a nozzle, a turret, a high-pressure hose, a pressure washer, a direct current or a DC power source, an alternating current/direct current or a AC/DC converter and a 120V AC power source. The quadcopter pressure washer also includes an operator control panel include additional a pair of antennae that extend upward in a programmable position from the operator control panel to transmit or receive any suitable electromagnetic signals. The additional pair of antennae utilizes state-of-the-art Doppler radar technology in electrical communication with the battery and controller. The operator control panel includes a signal emitter positioned in front of the operator control panel.

9 Claims, 2 Drawing Sheets

(56) References Cited

U.S. PATENT DOCUMENTS

| | | | |
|---|---|---|---|
| 2015/0274294 A1* | 10/2015 | Dahlstrom | B64D 1/18 239/722 |
| 2015/0316927 A1* | 11/2015 | Kim | G03B 15/006 701/2 |
| 2016/0297545 A1* | 10/2016 | Yang | G05D 1/0011 |

* cited by examiner

US 10,384,781 B2

QUADCOPTER PRESSURE WASHER

BACKGROUND OF THE INVENTION

Field of the Invention

The present invention is a pressure washer. More specifically, the present invention is a quadcopter pressure washer.

Description of the Related Art

Cleaning higher surfaces may often be a difficult and cumbersome task as they may not be easily accessed. Likewise accessing surfaces that are out of reach usually require the use of a ladder, for example, which may be very dangerous and result in an accident.

What is needed is a quadcopter pressure washer is to provide consumers with an effective means to pressure wash the sides of residential houses, commercial buildings, tanks and structures that may not be reached without the use of stepladders, scaffolding, and lift machines.

SUMMARY OF THE INVENTION

The present invention is a pressure washer. More specifically, the present invention is a quadcopter pressure washer.

The quadcopter pressure washer includes a tubular airframe, a plurality of rotary motors, a battery and controller, a pair of antennae, a signal receiver, a nozzle, a turret, a high-pressure hose, a pressurized washer, a direct current or a DC power source, an alternating current/direct current converter or a AC/DC converter and a 120V AC power source. The quadcopter pressure washer also includes an operator control panel that includes an additional pair of antennae that extend upward in a programmable position from the operator control panel to transmit or receive any suitable electromagnetic signals.

It is an object of the present invention to provide a quadcopter pressure washer that may facilitate cleaning objects and surfaces in remote areas.

It is an object of the present invention to provide a quadcopter pressure washer that includes a non-transitory storage media that enables pre-programmed vertical and horizontal positioning as well as full manual positioning at operator discretion, wherein dimensions of the surface to be cleaned may easily be programmed into the remote controller and the software would maneuver the quadcopter pressure washer over the surface for automated cleaning.

It is an object of the present invention to provide a quadcopter pressure washer that may also be powered with a rechargeable battery.

It is an object of the present invention to provide a quadcopter pressure washer that may also be powered with a 120V AC ground source converted to direct current or DC power and connected to an airframe via an electrical cable with a provided converter and DC cable.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Figure 1:
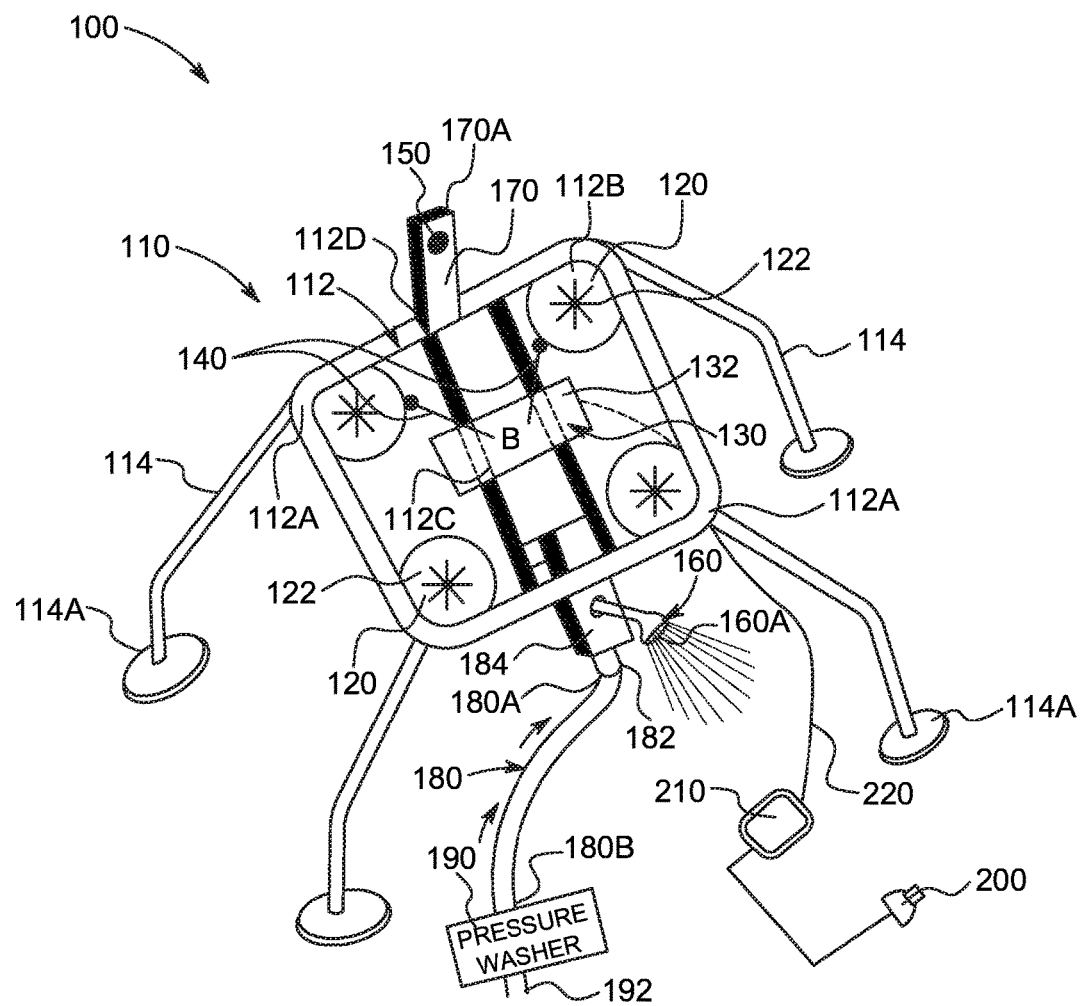
FIG. 1 illustrates a front view of a quadcopter pressure washer, in accordance with one embodiment of the present invention.

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention, however the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

The quadcopter pressure washer 100 may include a tubular airframe 110, a plurality of rotary motors 120, a battery and controller 130, a pair of antennae 140, a signal receiver 150, a nozzle 160, a turret 170, a high-pressure hose 180, a pressurized washer 190, a direct current or a DC power source 200, an alternating current/direct current or a AC/DC converter 210 and a 120V AC power source 220.

The tubular airframe 110 having a planar top surface 112 and a plurality of tubular supports 114. The tubular supports 114 may be attached to each corner 112A of the planar top surface 112 and extend outward and downward. The tubular supports 114 may have a pad 115 placed on each end 114A of the tubular supports 114 to stable the quadcopter pressure washer 100 while in use. FIG. 1 illustrates four tubular supports 114. The rotary motors 120 may having a plurality of propellers 122 for each of the rotary motors 120. The rotary motors 120 and the propellers 122 may be placed on top 112B of each corner 112A of the planar top surface 112 to produce lift for the quadcopter pressure washer 100. The battery and controller 130 may be placed on a center top portion 112C of the planar top surface 112. The battery and controller 130 may provide controlled electrical power to the quadcopter pressure washer 100. The battery and controller 130 may include a non-transitory storage media 132 that resides on the battery and controller 130. The non-transitory storage media 132 that may enable pre-programmed vertical and horizontal positioning as well as full manual positioning at operator discretion, wherein dimensions of the surface to be cleaned may easily be programmed into the operator control panel (FIG. 2, 230) and the non-transitory storage media 132 would maneuver the quadcopter pressure washer 100 over the surface for automated cleaning.

Figure 2:
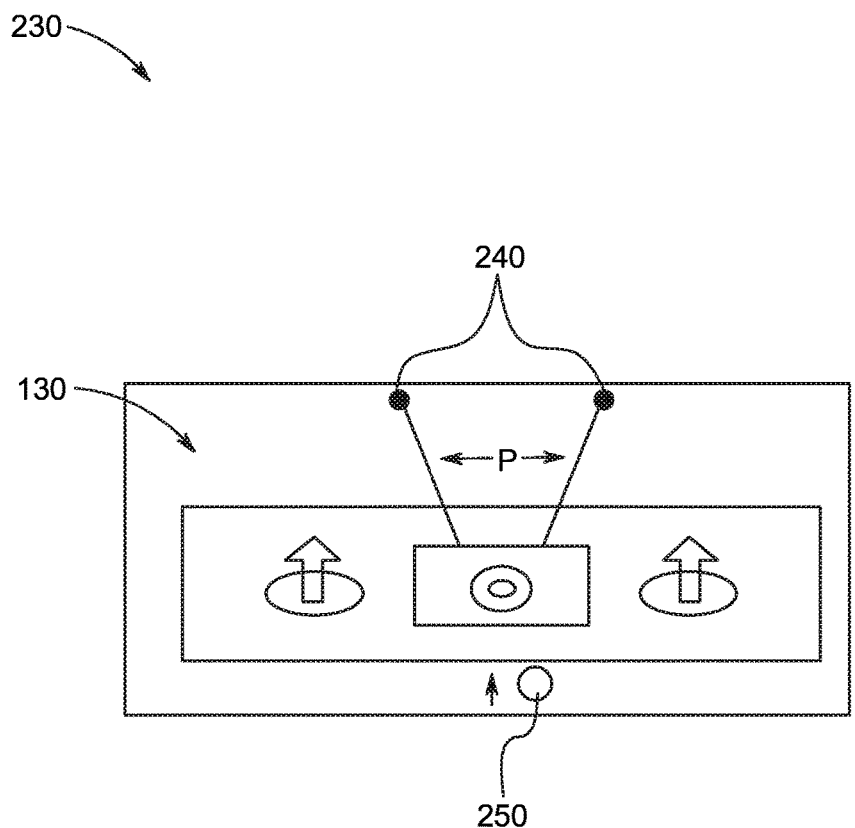
FIG. 2 illustrates a side view of an operator control panel, in accordance with one embodiment of the present invention.

The pair of antennae 140 may extend upward from the battery and controller 130 to receive any suitable electromagnetic signals. The pair of antennae 140 may convert electric power from the battery and controller 130 and transmit and receive a plurality of radio waves. The signal receiver 150 may receive a signal from the signal emitter (FIG. 2, 250) positioned in front of the operator control panel (FIG. 2, 230). The nozzle 160 may be a fixed high pressure nozzle 160A to disperse a plurality of cleaning fluid that may be a cleaning solution or a cleaning foam. The turret 170 may vertically extend from an edge 112D of the planar top surface 112 and have the signal receiver 150 placed on a top portion 170A of the turret 170. The high-pressure hose 180 may have a first end 180A and a second end 180B. The first end 180A of the high-pressure hose 180 may be coupled to a quick disconnect coupling 182 that is coupled to a sprayer controller 184. The sprayer controller 184 may control the cleaning fluid being dispersed by the nozzle 160. The pressurized washer 190 may be coupled to the second end 180B of the high-pressure hose 180 and provide the cleaning fluid being dispersed by the nozzle 160. The pressurized washer 190 may also receive water from a water line 192 that mixes the water from the water line 192 with the cleaning fluid contained inside of the pressurized washer 190. The pressurized washer 190 may also be a ground unit or other suitable unit. The direct current or DC power source 200 may provide electrical power to the rotary motors 120 and the propellers 122. The alternating current/direct current or AC/DC converter 210 may convert AC power to the DC power source 200. The 120V AC power source 220 may provide the AC power to the AC/DC converter 210 that may convert AC power to the DC power source 200.

FIG. 2 illustrates a side view of an operator control panel 230, in accordance with one embodiment of the present invention.

The operator control panel 230 may include additional a pair of antennae 240 that may extend upward in a programmable position from the operator control panel 230 to transmit or receive any suitable electromagnetic signals. The additional pair of antennae 240 may utilize state-of-the-art Doppler radar technology in electrical communication with the battery and controller 130. The operator control panel 230 may include a signal emitter 250 positioned in front of the operator control panel 230. The operator control panel 230 may serve as a remote control to control the quadcopter pressure washer (FIG. 1, 100). The operator control panel 230 may allow positioning of the quadcopter pressure washer airframe and the nozzle in a desired direction or area while keeping the quadcopter pressure washer 100 on the ground at all times.

While the present invention has been related in terms of the foregoing embodiments those skilled in the art will recognize that the invention is not limited to the embodiments described. The present invention may be practiced with modification and alteration within the spirit and scope of the appended claims. Thus, the description is to be regarded as illustrative instead of restrictive on the present invention.

What is claimed is:

1. A quadcopter pressure washer, comprising:
   a rounded rectangular tubular airframe having a planar top surface, such that the rounded rectangular tubular airframe has an equal width on each side;
   a plurality of tubular supports disposed on at least a portion of the rounded rectangular tubular airframe to stabilize the quadcopter pressure washer while in use, such that at least one of the plurality of tubular supports is disposed on each corner of the rounded rectangular tubular airframe, such that each of the plurality of tubular supports on a first side of the rounded rectangular tubular airframe extends away from the rounded rectangular tubular airframe in a first direction, and each of the plurality of tubular supports on a second side of the rounded rectangular tubular airframe extends away from the rounded rectangular tubular airframe in a second direction, such that a first section of each of the plurality of tubular supports is oriented at an angle with respect to the rounded rectangular tubular airframe, and a second section of each of the plurality of tubular supports is oriented at a different angle with respect to the first section;
   a plurality of rotary motors disposed on each corner of an interior portion of the planar top surface, such that each rotary motor is coplanar with the planar top surface of the tubular airframe and has a propeller to produce lift for the quadcopter pressure washer;
   a battery and controller placed on a center top portion of the planar top surface, the battery and controller provide controlled electrical power to the quadcopter pressure washer, such that the battery and controller includes a non-transitory storage media that resides on the battery and controller;
   a pair of antennae extending upward from the battery and controller to receive any suitable electromagnetic signals, the pair of antennae convert electric power from the battery and controller and transmit and receive a plurality of radio waves;
   a signal receiver receiving a signal from a signal emitter positioned in front of an operator control panel;
   a nozzle dispersing a plurality of cleaning fluid that is a cleaning fluid;
   a turret vertically extending from an edge of the planar top surface, the signal receiver placed on a top portion of the turret;
   a high-pressure hose having a first end and a second end, the first end of the high-pressure hose coupled to a quick disconnect coupling that is coupled to a sprayer controller, the sprayer controller controls the cleaning fluid being dispersed by the nozzle;
   a pressurized washer coupled to the second end of the high-pressure hose and provides the cleaning fluid being dispersed by the nozzle, the pressurized washer also receives water from a water line and mixes the water with the cleaning fluid contained inside of the pressurized washer;
   a DC power source providing electrical power to the rotary motors and the propellers;
   an AC/DC converter converting AC power to the DC power source; and
   a 120V AC power source providing the AC power to the AC/DC converter that convert AC power to the DC power source.

2. The quadcopter pressure washer according to claim 1, further comprising an operator control panel serving as a remote control to control the quadcopter pressure washer.

3. The quadcopter pressure washer according to claim 2, wherein the operator control panel includes additional a pair of antennae that extend upward in a programmable position from the operator control panel to transmit or receive any suitable electromagnetic signals.

4. The quadcopter pressure washer according to claim 3, wherein the additional pair of antennae communicate with the battery and controller utilizing state-of-the-art Doppler radar technology.

5. The quadcopter pressure washer according to claim 3, wherein the operator control panel allows positioning of the quadcopter pressure washer airframe and the nozzle in a desired direction or area.

6. The quadcopter pressure washer according to claim 1, wherein the nozzle is a fixed high pressure nozzle.

7. The quadcopter pressure washer according to claim 1, wherein the cleaning fluid is a cleaning liquid.

8. The quadcopter pressure washer according to claim 1, wherein the cleaning fluid is a cleaning foam.

9. The quadcopter pressure washer according to claim 1, wherein the pressure washer is a ground unit.

\* \* \* \* \*